United States Patent
Froc

(10) Patent No.: US 10,419,151 B2
(45) Date of Patent: Sep. 17, 2019

(54) PROCESS FOR DETECTING DETUNING AT WAVELENGTH SPLITTER IN OPTICAL FIBRE TRANSMISSION NETWORK AND OPTICAL FIBRE TRANSMISSION NETWORK

(71) Applicant: MITSUBISHI ELECTRIC CORPORATION, Tokyo (JP)

(72) Inventor: Gwillerm Froc, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/311,278

(22) PCT Filed: Aug. 17, 2017

(86) PCT No.: PCT/JP2017/030219
§ 371 (c)(1),
(2) Date: Dec. 19, 2018

(87) PCT Pub. No.: WO2018/038187
PCT Pub. Date: Mar. 1, 2018

(65) Prior Publication Data
US 2019/0238253 A1  Aug. 1, 2019

(30) Foreign Application Priority Data

Aug. 22, 2016  (EP) .................................... 16306072

(51) Int. Cl.
*H04J 14/02* (2006.01)
*G02B 6/12* (2006.01)
*H04B 10/079* (2013.01)

(52) U.S. Cl.
CPC ...... *H04J 14/0242* (2013.01); *G02B 6/12033* (2013.01); *H04B 10/07957* (2013.01)

(58) Field of Classification Search
CPC ............. H04J 14/0242; G02B 6/12033; H04B 10/07957
See application file for complete search history.

(56) References Cited

U.S. PATENT DOCUMENTS

| | | | |
|---|---|---|---|
| 2015/0377656 A1* | 12/2015 | Bastianini | G01D 5/35364 356/301 |
| 2016/0056912 A1* | 2/2016 | Froc | H04B 10/0779 398/27 |
| 2016/0248501 A1* | 8/2016 | Froc | H04B 10/2507 |
| 2016/0269109 A1* | 9/2016 | Dahlfort | H04B 10/07953 |

* cited by examiner

*Primary Examiner* — Mina M Shalaby
(74) *Attorney, Agent, or Firm* — Birch, Stewart, Kolasch & Birch, LLP

(57) ABSTRACT

A process for detecting a detuning which currently exists at a wavelength splitter within an optical fiber transmission network, comprises assessing expected values relating to at least two light sub-carriers, and determining actual values relating to said at least two light sub-carriers. A wavelength shift value which quantifies the existing detuning is obtained from a comparison between the expected and actual values. The process may be completed with updating a tuning of a light source from which the sub-carriers are derived, so as to reduce the wavelength shift.

18 Claims, 4 Drawing Sheets

PROCESS FOR DETECTING DETUNING AT WAVELENGTH SPLITTER IN OPTICAL FIBRE TRANSMISSION NETWORK AND OPTICAL FIBRE TRANSMISSION NETWORK

TECHNICAL FIELD

The present invention relates generally to optical fibre transmission networks, and more particularly to tuning the carrier wavelength to be used by an optical line termination to communicate with an optical network unit through a wavelength splitter.

BACKGROUND ART

Optical fibre transmission networks, and more particularly those of passive optical network type, are increasingly used to provide network access to residential or office gateways, or to ensure mobile front- and/or backhauling.

In an attempt to increase the number of users served through one access system to the network, wavelength division multiplexing technologies have been developed. These technologies take advantage of multiplexing several signals using different light carrier wavelengths in one optical fibre. Then, a wavelength splitter is used to select the signals supported by one light carrier and direct them to the intended user device. To this purpose, the wavelength splitter is placed on an optical fibre-path which connects the optical transmission device, for example an optical line termination, to the optical user device, for example an optical network unit. Several types of wavelength splitters currently exist, including thin films based devices, interference cavities as AWG (Array Wavelength Gratings) and FBG (Fiber Bragg Gratings). One wavelength splitter is commonly comprised of several filters which are combined with one another.

Generally, the wavelength splitter has two functions depending on the direction of the signals transmitted. For downstream transmission, i.e. from an optical line termination to an optical network unit, the wavelength splitter produces a signal selection based on the light carrier wavelength as previously mentioned, and forwards the signals selected through an output port of the wavelength splitter which is connected to the optical network unit. For upstream transmissions, i.e. from one among at least two optical network units to the optical line termination, the wavelength splitter collects the signals from the optical network units through respective optical fibres, each signal being supported by a dedicated light carrier, and combines them within one single optical fibre to the optical line termination. For performing these functions, the wavelength splitter has a filtering feature of passband type between one input port and each one of its output ports, which indicates the wavelength range of the signals—i.e. of the light carrier of each signal—that can be transferred from the input port of the wavelength splitter which is connected to the optical line termination, to the output port of concern which is connected to at least one optical network unit.

But the wavelength splitter may be located in any environment between the optical line termination and the optical network units, for example along a street or in the country, and is subject to environment parameter variations such as temperature variations. Then, the wavelength splitter may be capable to transfer the signals supported by one light carrier downstream from the optical line termination to the optical network unit during a time period, and may be no longer capable of transferring signals supported by the same light carrier, from the same optical line termination to the same optical network unit, after one environment parameter has varied in an uncontrolled manner. Such operation failure is called detuning by the Man skilled in the art, thereby indicating that uncontrolled variations at the wavelength splitter has caused a mismatch between the filtering feature of the wavelength splitter and the light carrier wavelength implemented by the optical line termination. Detuning also affects the upstream signals in a similar manner. For both downstream and upstream signals, detuning decreases the transmission quality of the optical fibre transmission network, and can even inhibit the transmission capacity.

It is possible to ensure continuing transmission at the wavelength splitter whatever the variations of the environment parameters, by providing stabilization of these parameters as they affect the wavelength splitter. For example, temperature at the wavelength splitter may be controlled, possibly by using a Peltier element. However, any system designed for compensating for the variations of at least one environment parameter is power-consuming, and therefore must be supplied with energy, most often with electrical power, from a power source. But implementing such energy supply may be complicated and very expensive for some locations of the wavelength splitter, for example when it is far from inhabited areas. In addition, because the optical fibre transmission network may involve a great number of wavelength splitters, it is of main interest that each one or at least some of these wavelength splitters can be installed in a simple and cost-effective manner.

Then, starting from the requirement that the wavelength splitters should not be combined with environment variation compensating systems, passive optical networks have been proposed. In these passive optical networks, the wavelength of a light carrier is adapted to the currently existing filtering feature of the wavelength splitter. Put another way, the effect of the uncontrolled environment parameters onto the wavelength splitter are taken into account by the source of the light carrier, so that the carrier wavelength keeps matching the filtering feature of the wavelength splitter. No power source is necessary any longer at the wavelength splitter. But then, a challenge consists in detecting a detuning which may appear between the light carrier as currently produced by the optical line termination and the actual filtering feature of the wavelength splitter.

An additional issue is then to compensate for such detuning for restoring maximum transmission capacity through the wavelength splitter.

In other respects, it is known to produce several light sub-carriers from one and same light carrier, so as to implement orthogonal frequency-division multiplexing. Such sub-carriers may be produced by modulating the light carrier simultaneously with several hyper-frequency components, these components being further phase- and/or amplitude-modulated for encoding the data to be transmitted. At a wavelength splitter, all the sub-carriers are transmitted between one same optical input port and one same optical output port of the wavelength splitter, since the differences in wavelength between any two sub-carriers are far less than the wavelength difference which exists between two light carriers.

Starting from this situation, one object of the present invention is to allow detecting a detuning which may exist at a wavelength splitter, in an efficient manner when optical sub-carriers are implemented in the optical fibre transmission network.

An additional object of the invention is to allow such detuning detection in an optical fibre transmission network of passive optical network type.

Still another object of the invention is to allow compensation for a currently existing detuning, while avoiding that the data transmission capacity is significantly impaired.

SUMMARY OF INVENTION

For meeting at least one of these objects or others, a first aspect of the invention proposes a process for detecting a detuning which currently exists at a wavelength splitter within an optical fibre transmission network, when the following conditions are met:
- the detuning occurs as a shift in wavelength between at least one filtering feature of the wavelength splitter and a set of light sub-carriers;
- the filtering feature varies as a function of a light wavelength for light transmitted from one input port of the wavelength splitter to one of the output ports of this wavelength splitter;
- each light sub-carrier corresponds to a respective wavelength value distinct from the wavelength values of the other light sub-carriers of the set, and based on a wavelength value of a light carrier from which the light sub-carriers of the set are derived; and
- the wavelength shift is defined as a difference between a currently existing wavelength position of a pattern of the filtering feature and a reference wavelength value which relates to the set of light sub-carriers as currently existing in the optical fibre transmission network at the input port of the wavelength splitter.

The process of the invention comprises the following steps:
- /1/ assessing expected values which relate to at least two of the light sub-carriers as these light sub-carriers would be received from the output port of the wavelength splitter, assuming alternately several tested values for the wavelength shift;
- /2/ determining actual values relating to the at least two light sub-carriers as currently received from the output port of the wavelength splitter; and
- /3/ inferring a value for the wavelength shift by selecting that one among the tested values which produces the best match between the expected values and the actual values for the at least two light sub-carriers.

Thus, the invention takes advantage of the plurality of sub-carriers for determining quantitatively the detuning which currently exists at the wavelength splitter. Because the wavelength difference between two sub-carriers is less than a wavelength extent of the filtering feature pattern, it is possible to detect and determine quantitatively the detuning extent, namely the shift which exists between the wavelength position of the filtering feature pattern of the wavelength splitter on one hand, and the reference wavelength of the sub-carrier set on the other hand, in a precise and reliable manner. This wavelength shift is determined by using a trial and simulation sequence, and selecting the value tested for the wavelength shift which corresponds to best matching between expected and actual values for the sub-carriers used, after transmission through the wavelength splitter.

In first implementations of the invention, the filtering feature may comprise a complex transfer factor of the wavelength splitter, which is effective between the input port and the output port. Then, the pattern of the filtering feature may be a modulus pattern which is effective for a modulus of the transfer factor. For such implementations, the expected and actual values which relate to the at least two light sub-carriers received from the output port are expected and actual sub-carrier intensity values, respectively. Possibly, the actual sub-carrier intensity values may be determined from a Fourier analysis of the light currently received from the output port of the wavelength splitter. Furthermore, simulated light absorption contributions due to components of the optical fibre transmission network other than the wavelength splitter, but including optical fibres, may be implemented in step /1/ for assessing the expected values for each value which is tested for the wavelength shift.

In alternative implementations of the invention when the filtering feature comprises again the complex transfer factor of the wavelength splitter, the pattern of the filtering feature may be an argument pattern which is effective for an argument of the transfer factor. Then, the expected and actual values which relate to the at least two light sub-carriers received from the output port are expected and actual sub-carrier phase-shift values, respectively. Possibly, the actual phase-shift value for each light sub-carrier as received from the output port of the wavelength splitter may then be obtained from at least one among:
- a division of an amplitude of a quadrature component of the light sub-carrier by an amplitude of an in-phase component of this light sub-carrier;
- a division of an amplitude of a quadrature component of the light sub-carrier by an amplitude of this light sub-carrier; and
- a division of an amplitude of an in-phase component of the light sub-carrier by an amplitude of this light sub-carrier.

In these alternative implementations of the invention, both quadrature and in-phase components relate to the sub-carrier as received from the output port of the wavelength splitter. The expected phase-shift value for each light sub-carrier is then assessed by summing phase-shift contributions which occur for this light sub-carrier in the optical fibre transmission network outside the wavelength splitter, from a phase relationship which exists initially for all the light sub-carriers upon being produced.

Generally for the invention, the pattern of the filtering feature may be obtained from a record. Alternatively, it may be obtained from a training process based on light measurements which are performed with light received from the output port of the wavelength splitter.

Also generally for the invention, the reference wavelength value which relates to the set of the light sub-carriers as currently existing in the optical fibre transmission network at the wavelength splitter, may be determined by implementing a Zadoff-Chu sequence.

Generally again, the at least two light sub-carriers which are used in steps /1/ to /3/ may be pilot sub-carriers which are devoid of data encoding at least temporarily during step /2/. Alternatively, these at least two light sub-carriers used in steps /1/ to /3/ may also continually be used for data transmission, including during step /2/, but then a data encoding effect is preferably involved in step /1/ for assessing the expected values which relate to these light sub-carriers.

The invention process may be completed with a step /4/ of updating a setting of at least one tuning parameter of a light source which is used for producing the light carrier, and from which the light sub-carriers are derived through respective modulations applied to the light carrier. These updates of the tuning parameter are performed so as to reduce the wavelength shift which currently exists at the wavelength splitter. Preferably, at least steps /1/ and /3/ may be executed in at least one tuning control system which is connected to the optical fibre transmission network, and is separate from the wavelength splitter. Then adjustment commands may be received by tuning means of the light source so as to update the setting of the tuning parameter of the light source. In particular, the tuning control system may be remote from an optical line termination which contains the light source and which is connected to the optical fibre transmission network. Then, the value of the wavelength shift inferred in step /3/ may be transmitted by the tuning control system to the optical line termination, in control messages which are transmitted by the optical fibre transmission network. Preferably when performing such step /4/ is contemplated, the update of the setting of the tuning parameter may be triggered only if the value of the wavelength shift as inferred in step /3/ is higher than a first threshold, in absolute value. This avoids implementing very small changes in the tuning parameter, which may not improve significantly the transmission quality but may cause temporary reductions in the transmission capacity. Optionally, the update of the setting of the tuning parameter may also be triggered if a wavelength shift time-derivation assessed from several wavelength shift values which have been inferred successively, is higher than a second threshold, in absolute value. Implementing such second trigger condition which is based on the time-derivation avoids that the detuning increases too much before retuning of the light source is started.

The invention applies in particular when the optical fibre transmission network is of orthogonal frequency-division multiplexing type, preferably additionally of passive optical network type. Such optical fibre transmission network may be suitable for a data transmission rate of at least 10 Gbits per second (Gbps), preferably between 10 Gbits per second and 100 Gbits per second, when summed over the set of light sub-carriers.

A second aspect of the invention proposes an optical fibre transmission network, which comprises at least one wavelength splitter, and which is suitable for implementing a process according to the first invention aspect, for detecting a detuning currently existing at the wavelength splitter.

According to one improvement, the optical fibre transmission network may be further suitable for implementing at least temporarily a bit-loading process among the light sub-carriers of the set, once a detuning has been detected as being currently existing at the wavelength splitter. Then, according to a further improvement when the optical fibre transmission network comprises at least one optical network unit which is connected from the output port of the wavelength splitter through at least one optical fibre, the optical network unit may comprise a local oscillator for coherent detection of signals which are transmitted by the optical fibre to this optical network unit. Then the optical network unit may also comprise a phase-locked loop for tuning the local oscillator in accordance with the optical line termination which produces the signals. Then, the optical fibre transmission network may be provided with signalling means which are suitable for adapting an operation of the phase-locked loop of the optical network unit in accordance with a bit-loading process currently implemented for transmission between the optical line termination and the optical network unit.

Generally for an optical fibre transmission network according to the invention, the wavelength splitter may contain several output ports each derived from one and same input port of this wavelength splitter, and each output port being connected within the optical fibre transmission network so that a detuning detection process according to the first invention aspect can be implemented based on any one of the output ports. Then, the optical fibre transmission network may advantageously be suitable for producing signalling messages to be transmitted by this optical fibre transmission network once the detuning detection process is to be implemented based on a first one of the output ports of the wavelength splitter, so as to impede that the detuning detection process is also implemented based on at least another one of the output ports before the detuning detection process has been terminated for the first output port, or before the wavelength shift existing at the first output port has been reduced.

DESCRIPTION OF EMBODIMENTS

Figure 1:
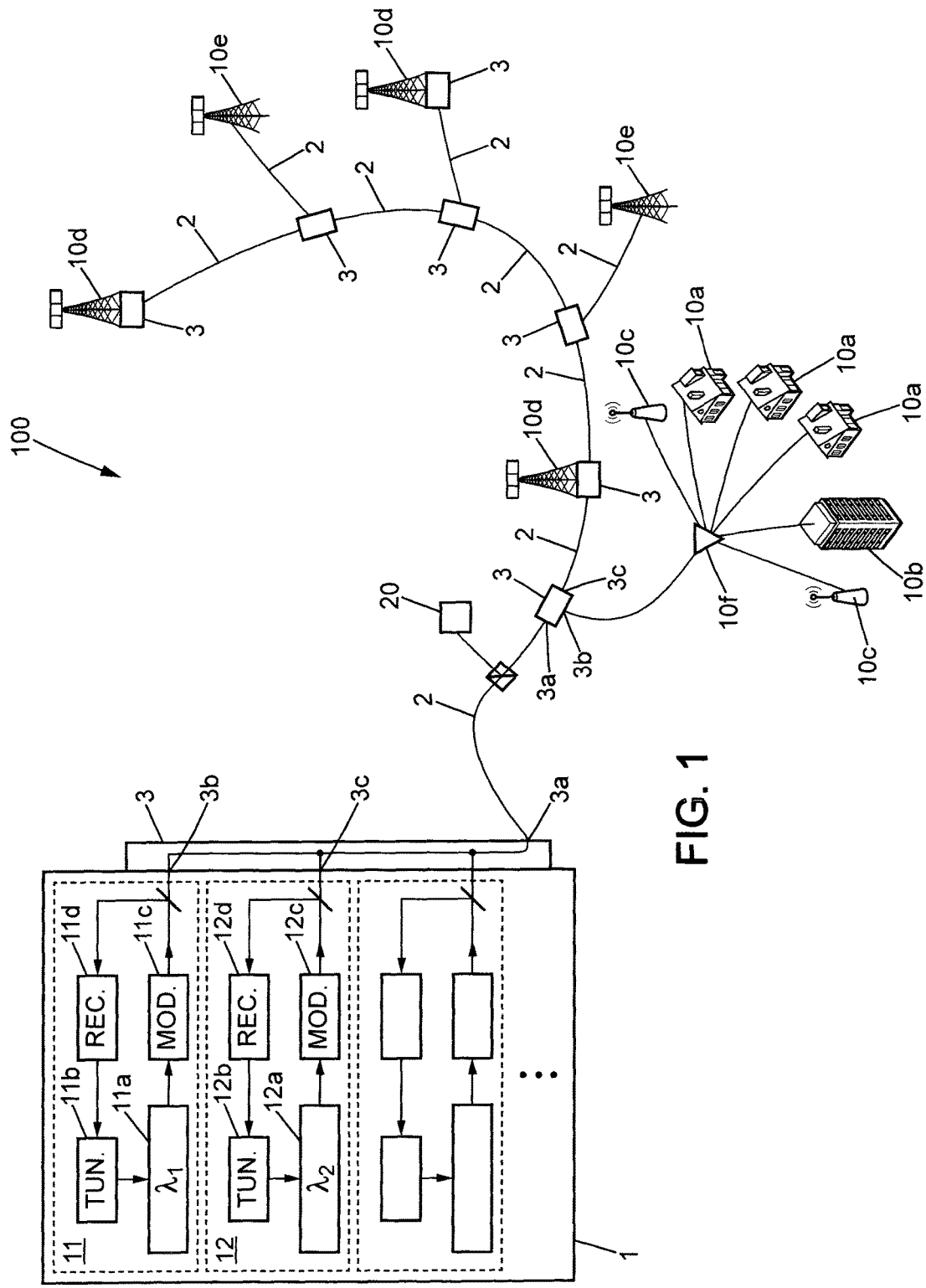
FIG. 1 illustrates an optical fibre transmission network in which the invention can be implemented.

FIG. 1 shows an optical fibre transmission network 100 in which the present invention can be applied. This network may meet the provisions of the ITU-T G.989 series and IEEE802.3av specifications. For clarity sake, connections from only one optical line termination to several optical network units are shown. The optical line termination 1 may be a central office for example. The optical network units 10a-10e may be residential (10a) or office (10b) facilities, for example with Fiber-To-The-Home connection type, small cell stations (10c), connected through a power splitter 10f, and 5G mobile base stations, either with fronthauling (10d) or backhauling (10e) architecture. Each optical network unit 10a-10e is connected to the optical line termination 1 through optical fibres 2 and wavelength splitters 3.

The optical line termination 1 may contain several monochromatic light sources, most often of tunable laser type, with respective wavelength values which are different from each other. Each wavelength value corresponds to a separate carrier, also called herein light carrier, generally in the range of 1310 nm (nanometer) to 1650 nm which corresponds to a transmission range of the optical fibres 2. The tuning extent of each light source is usually from about 4 nm to about 20 nm. Each carrier is dedicated to one of the optical network units 10a-10e through the optical fibre transmission network 100. A wavelength splitter 3 is also arranged between the output of the optical line termination 1 and the optical fibre transmission network 100, for collecting the modulated light beams which originate from all the light sources, and bringing them into the first optical fibre 2 from the optical line termination 1.

Within the optical line termination 1, reference signs 11, 12, . . . denote parallel transmission-reception paths. The transmission-reception path 11 (resp. 12, . . . ) contains the light source 11a (resp. 12a, . . . ) labelled with the corresponding carrier wavelength $\lambda_1$ (resp. $\lambda_2$, . . . ), tuning means 11b (resp. 12b, . . . ) labelled TUN, modulation means 11c (resp. 12c, . . . ) labelled MOD, and reception means 11d (resp. 12d . . . ) labelled REC. Other components of the optical line termination 1 which are not directly involved with the invention are not shown and will not be discussed. Within each transmission-reception path 11, 12, . . . , the tuning means 11b, 12b, . . . are designed for tuning the wavelength value $\lambda_1, \lambda_2, \ldots$ of the light carrier as produced by the light source 11a, 12a, . . . , through setting of an appropriate tuning parameter of this light source. The modulation means 11c, 12c, . . . produce a separate set of light sub-carriers from each light carrier, and also produce modulations of the light sub-carriers for encoding data to be transmitted through the optical fibre transmission network 100. The sub-carriers may be used for implementing orthogonal frequency-division multiplexing, known as OFDM data encoding process. The number of sub-carriers in each set as issued by the modulation means 11c, 12c, . . . may be from 64 to 1024. Each light sub-carrier set is produced from the wavelength $\lambda_1, \lambda_2, \ldots$ of the corresponding carrier by adding or subtracting multiples of a wavelength increment. This wavelength increment is commonly in the picometer range, much less than the tuning extent of the light sources 11a, 12a, . . . . It thus belongs to the hyper-frequency range, corresponding to frequency values of about 100 MHz (megahertz) to about 50 GHz (gigahertz). Sub-carrier modulation for data encoding and transmission may be of phase-shift keying type, or amplitude modulation, of any combination of phase- and amplitude modulations.

Each wavelength splitter 3 receives light corresponding to at least two carriers at an input port 3a of this wavelength splitter, and transmits at one of its output ports 3b, 3c light corresponding to one of the carriers (output port 3b for example), including all the sub-carriers derived from this carrier. Operation of the wavelength splitter 3 which is arranged at the output of the optical line termination 1 may be similar to that of the other wavelength splitters 3, when exchanging the downstream transmitted data flows for the upstream transmitted data flows.

Each optical network unit 10a-10e is most preferably colourless, meaning that it runs optical signal reception and transmission with carrier and sub-carrier wavelength values which are not initially assigned to this unit when it is manufactured. Then, the carrier and sub-carrier wavelength values which are assigned to each one of the optical network units 10a-10e are determined by the structure and operation of the network 100 and also the optical line termination 1. Optionally but preferably, each optical network unit 10a-10e implements coherent detection for recovering the data encoded through modulation of the light sub-carriers derived from the light carrier which is assigned to this optical network unit. To this purpose, the optical network unit comprises a local oscillator which operates in the hyper-frequency range, and a phase-locked loop which is arranged for tuning the local oscillator in accordance with the hyper frequency modulation of the sub-carriers. Then, an in-phase component and a quadrature component are determined for each light sub-carrier as received by the optical network unit, with respect to the local oscillator of this optical network unit.

The optical fibre transmission network 100 being passive means that no tuning, in particular no filter tuning, is implemented in the wavelength splitters 3, although they are each subject to optical variations caused by variations of environment parameters which occur at the location of each wavelength splitter, such as ambient temperature. More precisely, the filtering feature which relates to the capability of each wavelength splitter to transfer light limitedly within a transfer wavelength range from its input port to a fixed one of its output ports may vary in time. The filtering feature of the wavelength splitter may be comprised of a complex transfer factor, $T(\lambda)$, which varies as a function of the light wavelength $\lambda$. Then, the environment parameter variations which occur at the wavelength splitter mainly cause an almost constant pattern of the transfer factor to shift in wavelength position.

Detuning relates to a wavelength mismatch between the filtering feature of one of the wavelength splitters and the set of light sub-carriers to be transmitted through this wavelength splitter, to the optical network unit which is fibre-connected from the output port considered of the wavelength splitter. Because no tuning action is carried out onto the wavelength splitter in a passive optical network, wavelength tuning is to be performed at the optical line termination. No tuning is to be carried out at the optical network unit since this latter has a wide wavelength operation range, both in data reception and data transmission. Therefore, a first issue is to detect detuning as currently existing at a wavelength splitter, and preferably while data are continually transmitted between the optical line termination and the optical network unit at a rate of more than 10 Gbps, and preferably more than 100 Gbps. This transmission rate applies for the whole set of sub-carriers which is derived from the carrier assigned to the optical network unit.

Figure 2A:
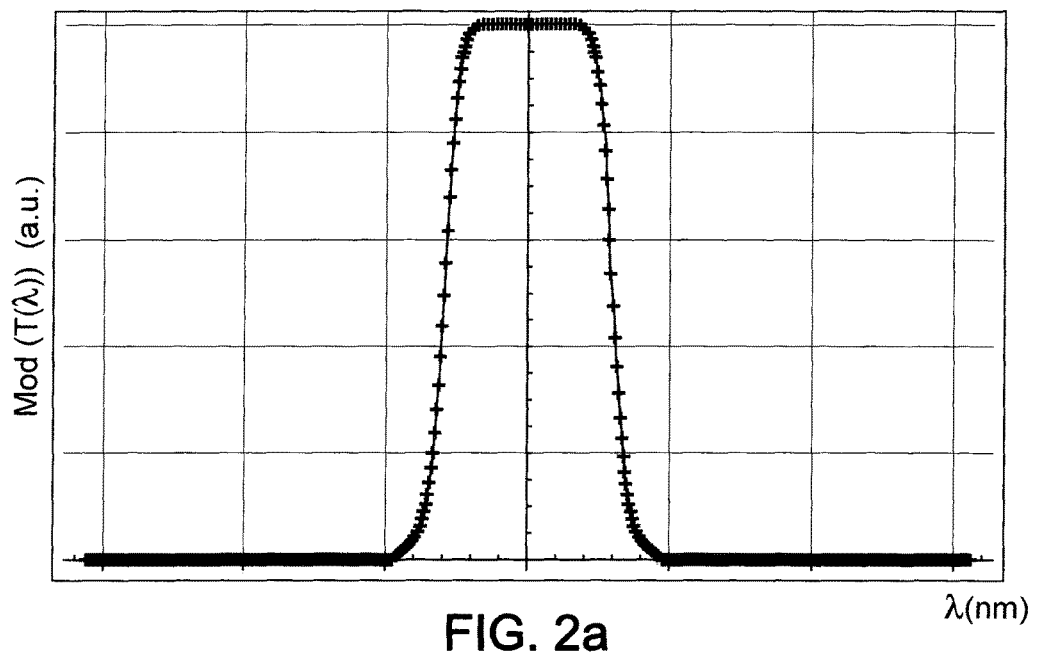
FIG. 2a displays wavelength variations of a filtering feature which is effective for a wavelength splitter, and which can be used for implementing the present invention.
Figure 2B:
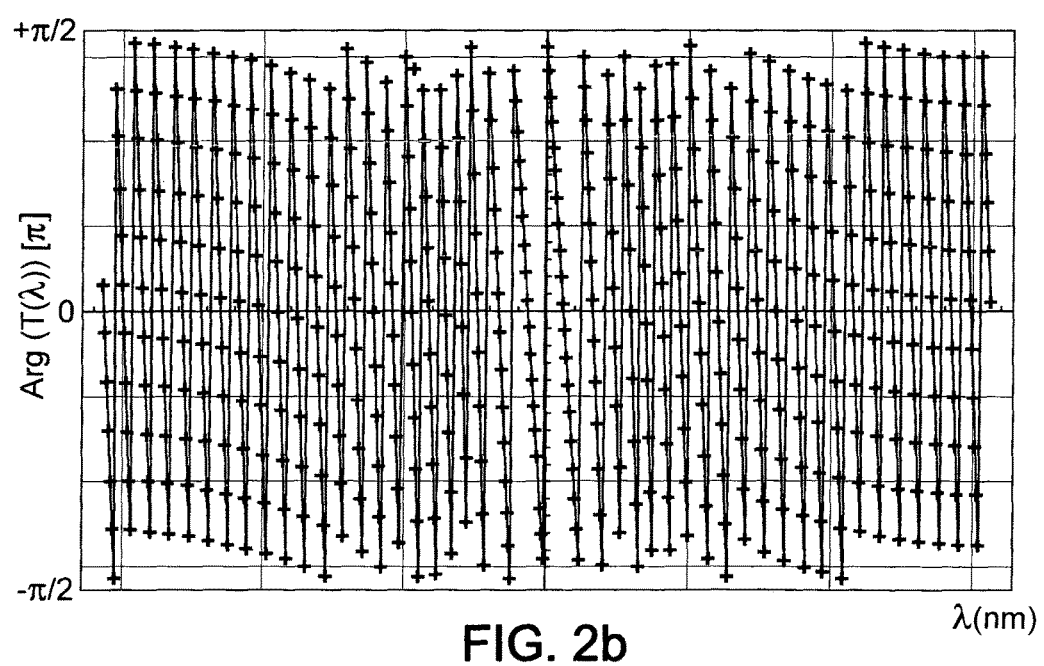
FIG. 2b corresponds to FIG. 2a for an alternative wavelength splitter filtering feature, which can also be used for implementing the present invention.

Because the transfer factor of the wavelength splitter has complex values, detuning detection may be based either on its modulus or on its argument. FIGS. 2a and 2b reproduce the variations of the modulus of the transfer factor, noted $Mod(T(\lambda))$ and displayed in arbitrary units (a.u.), and of its argument, noted $Arg(T(\lambda))$, as functions of the light wavelength $\lambda$. The modulus variations (FIG. 2a) are of passband filter type, with non-zero values only within a limited wavelength range. The steepness of the modulus variations on both ends of the passband range may vary, depending on the structure of the wavelength splitter. The argument of the transfer factor is represented modulo $\pi$ (FIG. 2b) although it is a continuous function of the light wavelength.

Figure 3A:
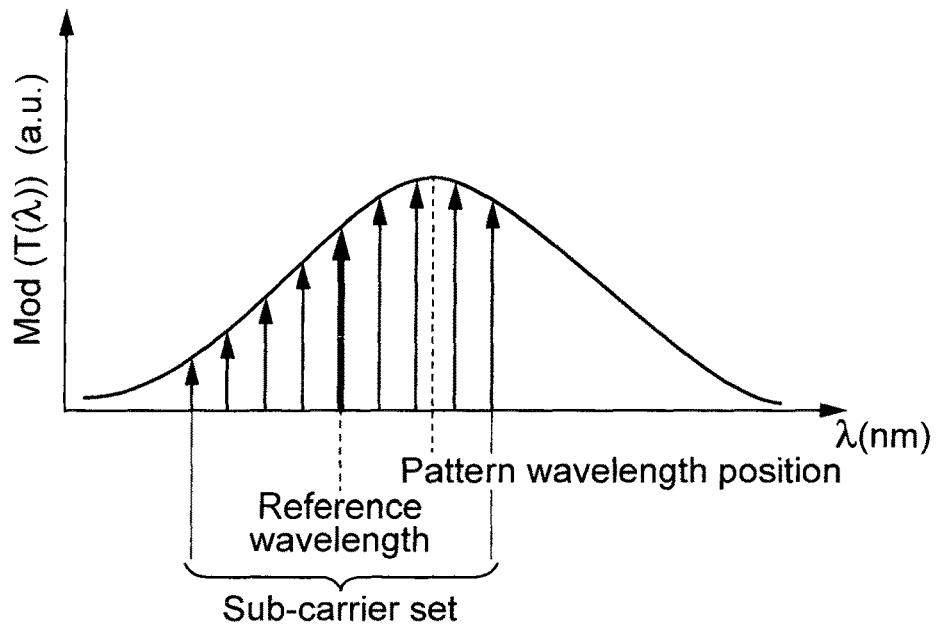
FIG. 3a illustrates a detuning situation for one of two possible patterns of a filtering feature effective for a wavelength splitter.
Figure 3B:
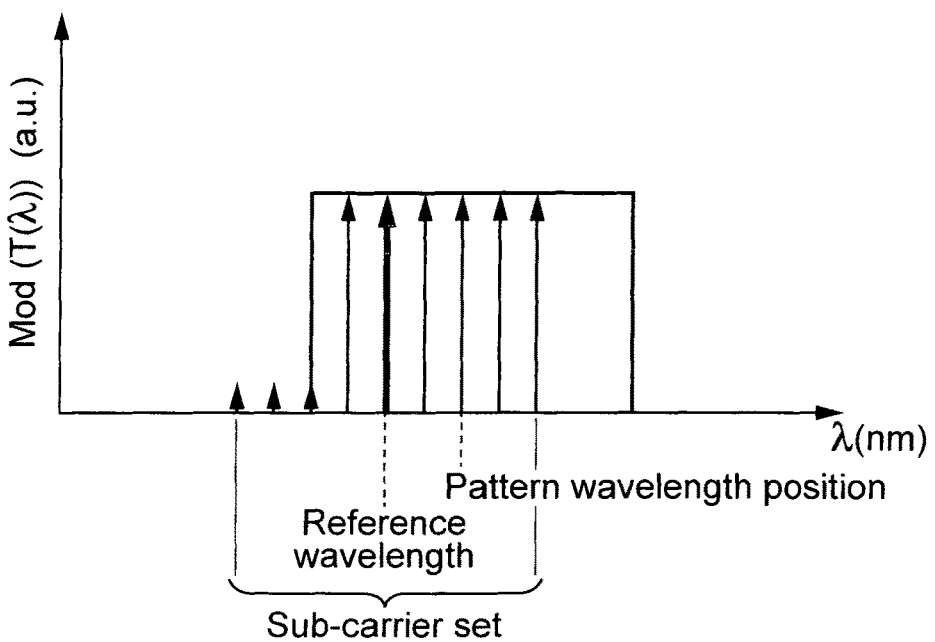
FIG. 3b illustrates a detuning situation for another one of two possible patterns of a filtering feature effective for a wavelength splitter.

First invention implementations now described are based on the modulus of the transfer factor (FIG. 2a). The general shape of the transfer factor modulus as a function of the wavelength, called modulus pattern in the general part of this description, remains substantially constant when the environment parameters of the wavelength splitter vary, although it is shifted in wavelength. Then, the actual transfer factor of the wavelength splitter may become offset in wavelength with respect to the set of light sub-carriers. FIGS. 3a and 3b illustrate such shift for a smooth transfer factor (FIG. 3a) and a steep transfer factor (FIG. 3b). Namely, the centre wavelength value of the modulus pattern, referred to as pattern wavelength position, is shifted with respect to a centre wavelength value of the set of the sub-carriers, this latter being referred to as reference wavelength of the sub-carrier set. In these figures, each light sub-carrier is represented as vertical arrow which is located at the corresponding wavelength, with an arrow length corresponding to the sub-carrier intensity as produced by the modulation means and transmitted through the wavelength splitter. In these figures, only nine sub-carriers are represented for the whole set, but this is only for clarity sake of the figures. The reference wavelength value used for defining the wavelength position of the sub-carrier set may also be other than its centre wavelength, provided it is fixed with respect to the sub-carrier set. Generally for the invention, the difference between the reference wavelength of the sub-carrier set and a wavelength used for specifying the position of the modulus pattern is called wavelength shift.

In possible implementations of the invention, the reference wavelength which is used for identifying the wavelength position of the sub-carrier set may be the wavelength value of one of the sub-carriers. That one among the sub-carriers which is used in this purpose may not be fixed initially, but determined upon starting the detuning detection process. It may then be identified by using a Zadoff-Chu sequence, for example. The Zadoff-Chu sequence is a training modulation sequence which is introduced at the optical line termination to the sub-carriers in the transmitted signal, and detected at the optical network unit after transmission through the wavelength splitter. It allows recovering a numbering of the sub-carriers, and therefrom determining the wavelength-position of the sub-carrier set. Such Zadoff-Chu implementation suits especially an OFDM optical fiber transmission network where the sub-carriers have a known initial phase relationship, also referred to as all the sub-carriers being initially locked in phase. On may report to the article entitled "Frequency Synchronization in OFDM System" by C. Geetha Priya, A. M. Vasumathi, Journal of Signal and Information Processing, 2013, 4, pp. 138-143.

The sub-carrier set can be wavelength-translated as a whole by changing the wavelength value of the light carrier from which it is derived within the optical line termination. And the carrier wavelength value can be varied using the tuning means of the corresponding transmission-reception path.

The modulus pattern may be recorded initially so as to be available to a tuning control system of the optical fibre transmission network 100, as discussed later herein. Alternatively, the modulus pattern may be obtained from a training process and then recorded. One main advantage of this latter implementation appears when the wavelength splitter is replaced, since the update of the record of the transfer factor pattern can be automatic during an initialization sequence, without any action from an operator.

Figure 4:
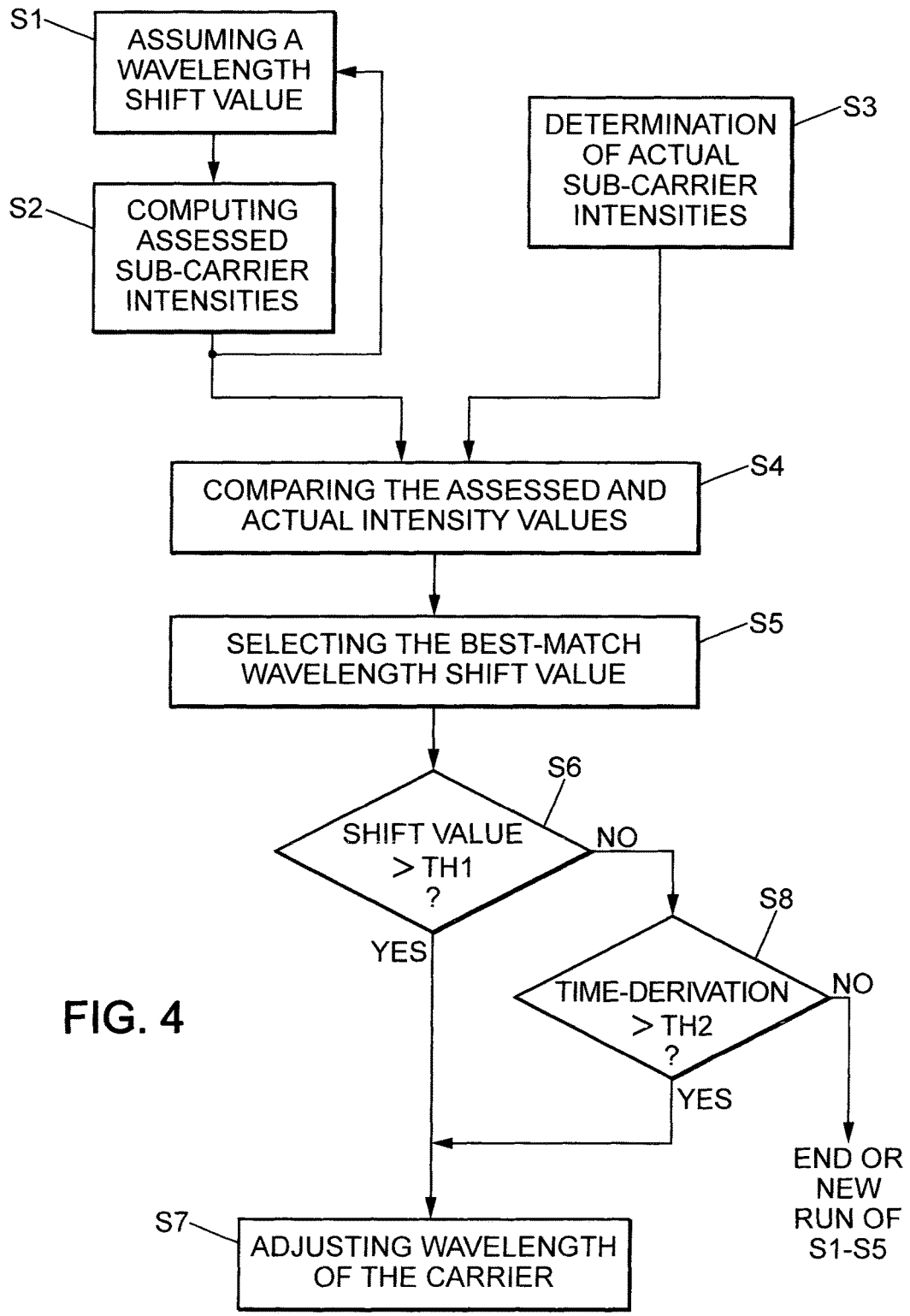
FIG. 4 is a-block diagram for a-process according to the invention.

With reference to FIG. 4, the invention detuning detection process starts with assessing intensity values for at least two of the sub-carriers, assuming a first value for the wavelength shift (steps S1 and S2). Each of these intensity assessments may be performed through calculation, by multiplying the intensity of the sub-carrier as produced by the optical line termination, by the value of the transfer factor modulus read for the wavelength value of the sub-carrier, and assuming the first wavelength shift value. Intensity losses which occur along the optical fibres and in any other component which participates to connecting the optical line termination to the wavelength splitter, and this latter to the optical network unit, may also be taken into account. Indeed, fibre length values are information items which are easily available in optical fibre transmission networks. The computed intensity values are then stored in connection with the first wavelength shift value. They have been called expected values in the general part of this description. These computations and records are repeated for a number of assumed values for the wavelength shift, called tested values.

Independently, actual intensity values are determined for the same sub-carriers (step S3), for example from instant intensity measurements which are performed at the optical network unit. The measurement results may be Fourier-transformed with respect to time for obtaining complex amplitudes which are associated respectively with the sub-carriers as received at the optical network unit. Then, the squared modulus of the complex amplitude is the actual intensity value for each sub-carrier. It is recorded for the sub-carriers used in steps S1 and S2.

Step S3 may be performed when no data is transmitted through the sub-carriers involved in the detuning detection process. Indeed, such transmitted data may alter the actual intensity values. Such sub-carriers devoid of data transmitted during step S3 have been called pilot sub-carriers in the general part of this description.

Alternatively, data can be transmitted continually during step S3 through the sub-carriers which are involved in the detuning detection process. Then, a correction may be applied to the sub-carrier intensities for taking into account a data encoding effect, and thus obtaining actual intensity values which relate to the sub-carriers without data transmitted. The Man skilled in data encoding and transmission knows algorithms suitable for assessing the effect of data encoding on intensity values.

In step S4, the actual intensity values obtained in step S3 are compared to the expected intensity values computed in the iterations of step S2. The tested wavelength shift value which corresponds to the best match between expected and actual intensity values, for all the sub-carriers used, is then selected and used as the actual wavelength shift value (step S5). It forms the result of the detuning detection process.

Steps S6 to S8 are optional and relate to adjusting the carrier wavelength so that matching is recovered between the reference wavelength of the sub-carrier set and the wavelength position of the modulus pattern of the wavelength splitter.

In step S6, the wavelength shift value selected in step S5 may be compared to a first threshold, denoted TH1. If it is higher than threshold TH1, the tuning means of the transmission-reception path within the optical line termination are operated, and controlled for adjusting the wavelength value of the carrier (step S7). The adjustment is performed in order to compensate for the wavelength shift as identified in step S5.

If the wavelength shift value selected in step S5 is less than or equal to threshold TH1, then a time-derivation of the actual wavelength shift may be assessed (step S8). Such time-derivation is computed from the values which have been selected in step S5 for successive executions of the step sequence S1-S5. If the value obtained for the time-derivation is higher than a second threshold, denoted TH2, step S7 is performed in this case also. If the value of the time-derivation is less than or equal to threshold TH2, then the process may be stopped or run again from step S1 or S3, possibly after a predetermined time period. Using step S8 in addition to step S6 for triggering an adjustment of the carrier wavelength allows compensating for drifts of the wavelength splitter before such drifts has significant impact of the data transmission capacity.

Second invention implementations now described are based on the argument of the transfer factor (FIG. 2b). These second implementations reproduce generally the step sequence of the first implementations based on the transfer factor modulus, but with the following adaptations:

the modulus of the transfer factor is to be replaced with the argument of the transfer factor, as another function of the light wavelength;

the expected and actual intensity values of the sub-carriers are to be replaced with expected and actual phase-shift values of the sub-carriers;

a method for assessing the expected phase-shift values of the sub-carriers is to be implemented, including appropriate phase-shift correction calculations; and a suitable method is to be implemented for determining the actual phase-shift values of the sub-carriers, including corrections to be applied.

The argument of the transfer factor is another function of the light wavelength, with a fixed argument pattern which may be shifted in wavelength due to the variations of the environment parameters at the wavelength splitter. The wavelength position of the argument pattern may be determined in several ways. It may correspond to a centre wavelength of the argument pattern, or an average between wavelength values where the argument pattern reaches fixed thresholds.

The expected values of the respective phase-shifts of the light sub-carriers are to be assessed with taking into account the effect of the wavelength splitter, but also those of the chromatic dispersion of the optical fibres.

The contribution of the wavelength splitter to the phase-shift undergone by each sub-carrier is read from the transfer factor argument, for the wavelength value of the sub-carrier while assuming a tested value for the wavelength shift.

The contribution of the optical fibres to the phase-shift undergone by each sub-carrier can be calculated from the fibre length values and from the chromatic dispersion coefficient of the optical fibres. The Man skilled in optical fibre transmissions knows appropriate mathematical formulae to be used for assessing the phase-shift contributions of the optical fibres.

Contributions to the phase-shifts due to other optical components which may be intermediate between the optical line termination and the optical network unit, should also be taken into account. These contributions, which may vary from one sub-carrier to another one, may be recorded initially but they are preferably recovered from a training process executed automatically or triggered by an operator.

All these contributions are added for assessing the expected phase-shift values, and further added to an initial phase value which relates to the sub-carrier on concern. For an optical fibre transmission network of OFDM type, the initial phases of all the sub-carriers are determined according to an initial phase relationship produced when synthesizing all the sub-carriers from a single carrier within the optical line termination 1. This initial phase relationship is used when assessing the expected phase-shift values for all the sub-carriers coherently with respect to each other.

The actual phase-shift value of each sub-carrier may be calculated again from the Fourier-transform of the instant intensity measurements performed by the optical network unit. For each sub-carrier which is used for detuning detection, at least two among an amplitude of a quadrature component, noted Q, an amplitude of an in-phase component, noted I, and an amplitude of the sub-carrier, noted A, are determined. The sub-carrier amplitude A equals $(I^2+Q^2)^{1/2}$. The quadrature and in-phase component amplitudes are determined with respect to the local oscillator which is implemented in the optical network unit when coherent detection is used. Then, the phase-shift may be determined using one of the following formulae: Arcsin(Q/A), Arccos (I/A) and Arctan(Q/I), where Arcsin, Arccos and Arctan respectively denote the inverse functions of sinus, cosinus and tangent, respectively. For instance in practical implementations, they can be read from corresponding lookup tables.

But these phase-shifts undergone by the sub-carriers are also affected by the phase noise of the light source which produces the carrier. However, this phase noise has similar effect onto all the sub-carriers, since they are all derived from the same light source. In addition, this phase noise due to the light source is zero on time-average with Gaussian time-distribution. Therefore, the actual phase-shift value which is determined for each sub-carrier to be used for detuning detection needs to be averaged from multiple determinations which are distributed over time.

The process as depicted in FIG. 4 can then be converted easily for such second implementations based on the argument of the transfer factor.

When non-zero detuning is detected, and until it is reduced or compensated for as a result of step S7, a bit-loading process may be implemented for transferring data transmission capacity from one sub-carrier which is not correctly transmitted through the wavelength splitter, because of the detuning, to another one of the sub-carriers which is transmitted correctly. For example, with reference to FIGS. 3a and 3b, bit-loading may be implemented from the sub-carriers with shorter wavelength values on the left end of the sub-carrier set to the sub-carriers with longer wavelength values on the right end of the set. Such bit-loading implementation is well-known in the art, so that it is not necessary to further describe it here. One can report advantageously in this concern to the article entitled "Adaptative OFDM for wideband rafio channels" by Andreas Czylwik, Deutsche Telekom AG, Research Center Am Kavalleriesand 3, 64295 Darmstadt, Germany. The transmission features for each sub-carrier between the optical line termination and the optical network unit may be used for configuring the bit-loading process to implement. In such case and when coherent detection is used at the optical network unit, it may be advantageous to adapt an operation of the phase-locked loop used for tuning the local oscillator of the optical network unit, as a function of the bit-loading process which is implemented. Such adaptation is well known to the Man skilled in coherent detection. Mainly, the phase-locked loop at the optical network unit operates based on the frequency-position of the energy-barycentre of all the sub-carriers received, whereas this energy-barycentre is frequency-shifted by the bit-loading process implemented. The frequency-shift of the energy-barycentre may be computed based on the configuration parameters used for the bit-loading process, and then this shift can be compensated for by using a suitable offset introduced in the phase-locked loop. Alternatively when it is implemented, the bit-loading process may be blocked at some times upon appropriate commands, in particular to avoid disturbance in the operation of the phase-locked loop used for coherent detection at the optical network unit. Signalling messages transmitted through the optical fibre transmission network may be used for controlling implementation of the bit-loading process and adaptation of the phase-locked loop operation.

Another improvement of the invention may be implemented when one wavelength splitter has several output ports, which may be fibre-connected to separate optical network units. Indeed, such wavelength splitter may have a structure such that the input port of the wavelength splitter is shared by the output ports, and the filtering features for all the output ports are simultaneously wavelength-shifted due to the variations of the environment parameters. Then, compensating for the wavelength shift for one of the output ports may produce compensation also for the other output ports. Therefore, it may be advisable to impede that detuning detection and compensation processes be executed simultaneously for several output ports of the same wavelength splitter. Such impediment may be implemented again through appropriate signalling messages. These messages may be transmitted to the optical network units which are not already involved with an on-going execution of the detuning detection or compensation process, but which are fibre-connected to output ports belonging to the same wavelength splitter as the output port which is used for the on-going execution. The messages are intended to block temporarily further executions of the detuning detection or compensation process which would use these other output ports.

Generally for the invention, although the modulations for producing the sub-carriers are implemented within the optical line termination and the measurements necessary for determining the actual values relating to the sub-carriers are implemented at the optical network units, the records, computations and process control steps may be executed by a dedicated system, also called tuning control system, connected to the optical fibre transmission network, and also to several optical line terminations. Such architecture may be cost-saving because the tuning control system is thus common to several or all the wavelength splitters of the network. In addition, it allows easier control for avoiding that the detuning detection or compensation process is executed simultaneously for separate output ports of one same wavelength splitter. Then such tuning control system which is dedicated for implementing the invention process may communicate through appropriate control and/or signalling messages with the optical network units and also with the optical line terminations. Such tuning control system is labelled 20 in FIG. 1. Obviously, the above-indicated records, computations and process control steps necessary for the invention may alternatively be implemented at the optical line termination, with direct control access to the modulation means.

The Man skilled in optical fibre transmission networks will understand that the invention can be implemented while adapting secondary aspects with respect to the detailed description that has been provided here-above. In particular, the number of sub-carriers which are used for assessing expected values in connection with tested wavelength shift values, and also used for determining actual values to be compared with the expected one, may be any higher than or equal to two. In particular, more reliable implementations may be based on all the sub-carriers which are comprised in the set related to one same light carrier.

INDUSTRIAL APPLICABILITY

This invention is applicable to optical fibre transmission networks in many kinds of fields.

The invention claimed is:

1. A process for detecting a detuning currently existing at a wavelength splitter within an optical fibre transmission network, said detuning occurring as a shift in wavelength between at least one filtering feature of the wavelength splitter and a set of light sub-carriers, the filtering feature varying as a function of a light wavelength for light transmitted from one input port of the wavelength splitter to one output port of said wavelength splitter, each light sub-carrier corresponding to a respective wavelength value distinct from the wavelength values of the other light sub-carriers of the set, and based on a wavelength value of a light carrier from which the light sub-carriers of the set are derived, a wavelength shift being defined as a difference between a currently existing wavelength position of a pattern of the filtering feature and a reference wavelength value which relates to the set of light sub-carriers as currently existing in the optical fibre transmission network at the input port of the wavelength splitter, the process comprising:
/1/ assessing expected values which relate to at least two of the light sub-carriers as said light sub-carriers would be received from the output port of the wavelength splitter, assuming alternately several tested values for the wavelength shift;
/2/ determining actual values relating to the at least two light sub-carriers as currently received from the output port of the wavelength splitter; and
/3/ inferring a value for the wavelength shift by selecting that one among the tested values which produces the best match between the expected values and the actual values for said at least two light sub-carriers.

2. The process according to claim 1, wherein the filtering feature comprises a complex transfer factor of the wavelength splitter, effective between the input port and the output port, and the pattern of said filtering feature is a modulus pattern effective for a modulus of said complex transfer factor, and wherein the expected and actual values which relate to the at least two light sub-carriers received from the output port are respective expected and actual sub-carrier intensity values.

3. The process according to claim 2, wherein the actual sub-carrier intensity values are determined from a Fourier analysis of light currently received from the output port of the wavelength splitter.

4. The process according to claim 1, wherein the filtering feature comprises a complex transfer factor of the wavelength splitter, effective between the input port and the output port, and the pattern of said filtering feature is an argument pattern effective for an argument of said complex transfer factor, and wherein the expected and actual values which relate to the at least two light sub-carriers received from the output port are expected and actual sub-carrier phase-shift values, respectively.

5. The process according to claim 4, wherein the actual phase-shift value for each light sub-carrier as received from the output port of the wavelength splitter is obtained from at least one among:
a division of an amplitude of a quadrature component of said light sub-carrier by an amplitude of an in-phase component of said light sub-carrier;
a division of an amplitude of a quadrature component of said light sub-carrier by an amplitude of said light sub-carrier; and
a division of an amplitude of an in-phase component of said light sub-carrier by an amplitude of said light sub-carrier;

both quadrature and in-phase components relating to the sub-carrier as received from the output port of the wavelength splitter, and the expected phase-shift value for each light sub-carrier is assessed by summing phase-shift contributions occurring for said light sub-carrier in the optical fibre transmission network outside the wavelength splitter, from a phase relationship existing initially for all the light sub-carriers upon being produced.

6. The process according to claim 1, wherein the pattern of the filtering feature is obtained from a record or from a training process based on light measurements performed with light received from the output port of the wavelength splitter.

7. The process according to claim 1, wherein the reference wavelength value relating to the set of the light sub-carriers as currently existing in the optical fibre transmission network at the wavelength splitter, is determined by implementing a Zadoff-Chu sequence.

8. The process according to claim 1, wherein the at least two light sub-carriers used in the /1/ assessing to the /3/ inferring are pilot sub-carriers which are devoid of data encoding at least temporarily during the /2/ determining, or wherein the at least two light sub-carriers which are used in the /1/ assessing to the /3/ inferring are also continually used for data transmission and a data encoding effect is involved in the /1/ assessing for assessing the expected values which relate to said at least two light sub-carriers.

9. The process according to claim 1, further comprising:
/4/ updating a setting of at least one tuning parameter of a light source which is used for producing the light carrier, and from which the light sub-carriers are derived through respective modulations applied to said light carrier, so as to reduce the wavelength shift currently existing at the wavelength splitter.

10. The process according to claim 9, wherein at least the /1/ assessing and the /3/ inferring are executed in at least one tuning control system connected to the optical fibre transmission network and separate from the wavelength splitter, and wherein adjustment commands are received for tuner of the light source so as to update the setting of the tuning parameter of said light source.

11. The process according to claim 10, wherein the tuning control system is remote from an optical line termination which contains the light source and which is connected to the optical fibre transmission network, and wherein the value of the wavelength shift inferred in the /3/ inferring is transmitted by the tuning control system to the optical line termination, in control messages transmitted by the optical fibre transmission network.

12. The process according to claim 9, wherein the update of the setting of the tuning parameter is triggered if the value of the wavelength shift inferred in the /3/ inferring is higher than a first threshold, in absolute value, and optionally also triggered if a wavelength shift time-derivation assessed from several wavelength shift values which have been inferred successively, is higher than a second threshold, in absolute value.

13. The process according to claim 1, wherein the optical fibre transmission network is of orthogonal frequency-division multiplexing type, preferably additionally of passive optical network type, and is suitable for a data transmission rate of at least 10 Gbits per second, preferably between 10 Gbits per second and 100 Gbits per second, when summed over the set of light sub-carriers.

14. An optical fibre transmission network, comprising at least one wavelength splitter, and suitable for implementing a process according to claim 1, for detecting a detuning currently existing at said wavelength splitter.

15. The optical fibre transmission network according to claim 14, of orthogonal frequency-division multiplexing type, preferably additionally of passive optical network type, and suitable for a data transmission rate of at least 10 Gbits per second, preferably higher than 100 Gbits per second, when summed over the set of light sub-carriers.

16. The optical fibre transmission network according to claim 14, suitable for implementing a bit-loading process among the light sub-carriers of the set once a detuning has been detected as being currently existing at the wavelength splitter.

17. The optical fibre transmission network according to claim 16, comprising at least one optical network unit which is connected from the output port of the wavelength splitter through at least one optical fibre, said optical network unit comprising a local oscillator for coherent detection of signals which are transmitted through the optical fibre to said optical network unit, and said optical network unit further comprising a phase-locked loop for tuning the local oscillator in accordance with an optical line termination which produces the signals,
the optical fibre transmission network being provided with signalling apparatus suitable for adapting an operation of the phase-locked loop of the optical network unit in accordance with a bit-loading process being currently implemented for transmission between the optical line termination and said optical network unit.

18. The optical fibre transmission network according to claim 14, wherein the wavelength splitter contains several output ports each derived from one and same input port of said wavelength splitter, and each output port being connected within the optical fibre transmission network so that a detuning detection process can be implemented based on any one of the output ports,
the detuning detection process detecting a detuning currently existing at a wavelength splitter within an optical fibre transmission network, said detuning occurring as a shift in wavelength between at least one filtering feature of the wavelength splitter and a set of light sub-carriers,
the filtering feature varying as a function of a light wavelength for light transmitted from one input port of the wavelength splitter to one output port of said wavelength splitter,
each light sub-carrier corresponding to a respective wavelength value distinct from the wavelength values of the other light sub-carriers of the set, and based on a wavelength value of a light carrier from which the light sub-carriers of the set are derived,
a wavelength shift being defined as a difference between a currently existing wavelength position of a pattern of the filtering feature and a reference wavelength value which relates to the set of light sub-carriers as currently existing in the optical fibre transmission network at the input port of the wavelength splitter,
the process comprising:
/1/ assessing expected values which relate to at least two of the light sub-carriers as said light sub-carriers would be received from the output port of the wavelength splitter, assuming alternately several tested values for the wavelength shift;
/2/ determining actual values relating to the at least two light sub-carriers as currently received from the output port of the wavelength splitter; and
/3/ inferring a value for the wavelength shift by selecting that one among the tested values which produces the best match between the expected values and the actual values for said at least two light sub-carriers,
and the optical fibre transmission network is suitable for producing signalling messages to be transmitted by said optical fibre transmission network once the detuning detection process is to be implemented based on a first one of the output ports of the wavelength splitter, so as to impede that the detuning detection process is also implemented based on at least one of the output ports of the wavelength splitter other than said first output port before the detuning detection process has been terminated for the first output port, or before the wavelength shift existing at the first output port has been reduced.

* * * * *